Figure 1:
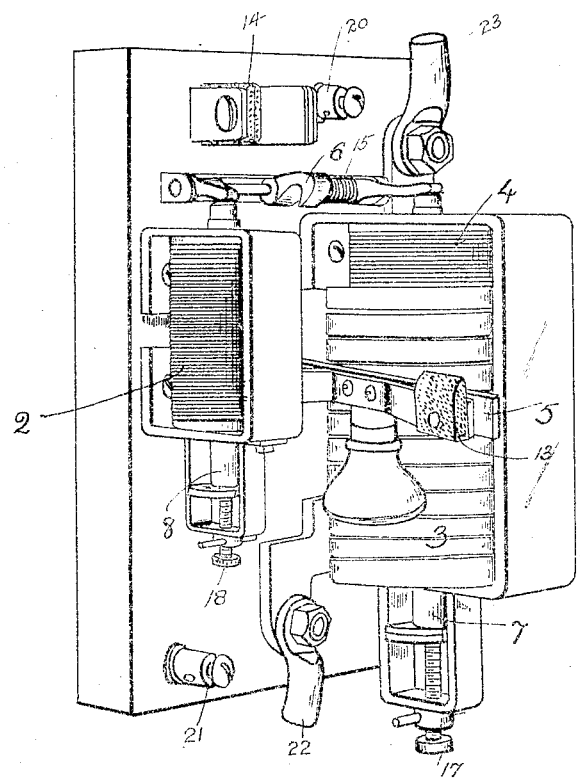

No. 779,376. PATENTED JAN. 3, 1905.
W. M. SCOTT.
AUTOMATIC MAGNETIC CIRCUIT BREAKER.
APPLICATION FILED MAY 27, 1899. RENEWED DEC. 11, 1901.

3 SHEETS—SHEET 1.

WITNESSES:
John N Reeve Jr
Mae Hoffmann

INVENTOR.
Wm. M. Scott

No. 779,376. PATENTED JAN. 3, 1905.
W. M. SCOTT.
AUTOMATIC MAGNETIC CIRCUIT BREAKER.
APPLICATION FILED MAY 27, 1899. RENEWED DEC. 11, 1901.

3 SHEETS—SHEET 2.

WITNESSES:
John W Reeve Jr.
Mae Hoffmann

INVENTOR
Wm. M. Scott
by Thos. Ewasdale atty

No. 779,376.

Patented January 3, 1905.

UNITED STATES PATENT OFFICE.

WILLIAM M. SCOTT, OF PHILADELPHIA, PENNSYLVANIA, ASSIGNOR TO CUTTER ELECTRICAL & MANUFACTURING COMPANY, A CORPORATION OF NEW JERSEY.

AUTOMATIC MAGNETIC CIRCUIT-BREAKER.

SPECIFICATION forming part of Letters Patent No. 779,376, dated January 3, 1905.

Application filed May 27, 1899. Renewed December 11, 1901. Serial No. 85,484.

*To all whom it may concern:*

Be it known that I, WILLIAM M. SCOTT, a citizen of the United States, residing at Philadelphia, in the county of Philadelphia and State of Pennsylvania, have invented a new and useful Automatic Magnetic Circuit-Breaker, of which the following is a specification.

My invention relates to automatic magnetic circuit-breakers, and is especially adapted to the protection of any apparatus which is capable of causing a reverse flow of energy in either direct or alternating current working, such as storage batteries, generators running in parallel, rotary transformers, motor generator sets, &c.

The object of my device is to provide automatic magnetic means for changing the condition in the circuit of any device capable of causing a reverse flow of energy upon the occurrence of any of several abnormal conditions tending to cause injury to such apparatus or device.

A specific application of my invention may be stated as follows: Take, for example, a mining-locomotive, which is operated in general upon the same system as a well-known trolley-car, but on account of the fact that some of the galleries through which such locomotive is required to pass are low and restricted the connection with the source of current is broken, and the locomotive is driven during such time by energy derived from a storage battery carried by it. Normally when the traveling contact of the locomotive is in communication with the main source of energy the motors and the storage battery receive current from such source. It is desirable in such a system to prevent a too rapid charging of the battery or upon excessive drop in potential at the terminals of the supply source a too great discharge back into the line or an excessive discharge through the motors, and the device herein described in addition to performing the above-named functions will operate as the usual overload-controller and interrupt the circuit also when the motors are taking too much current.

As stated above, upon a drop of the line-potential below that of the battery the battery will discharge into the line as well as into the motors and unnecessarily exhaust itself.

For a more detailed description of my invention reference is to be had to the accompanying drawings, in which—

Figure 2:
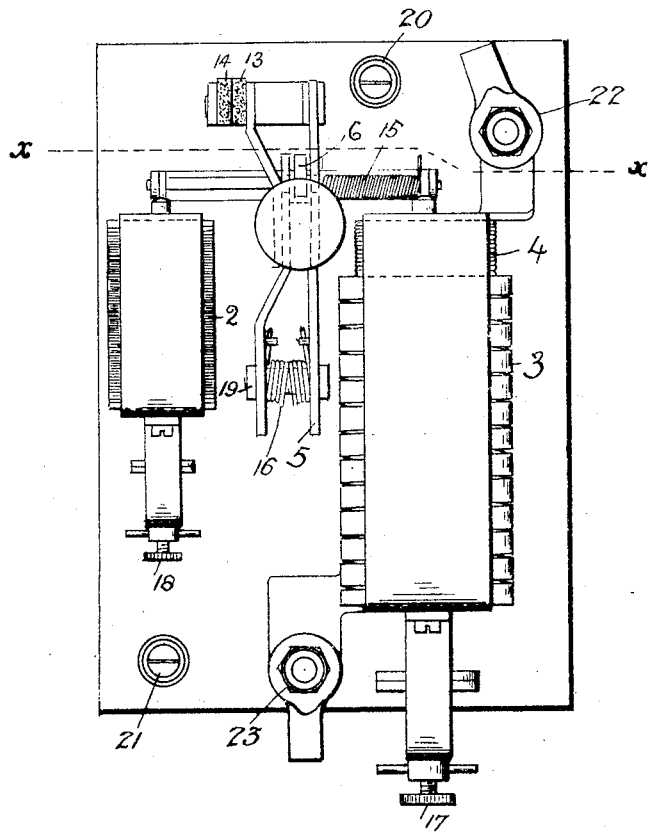
Figure 3:
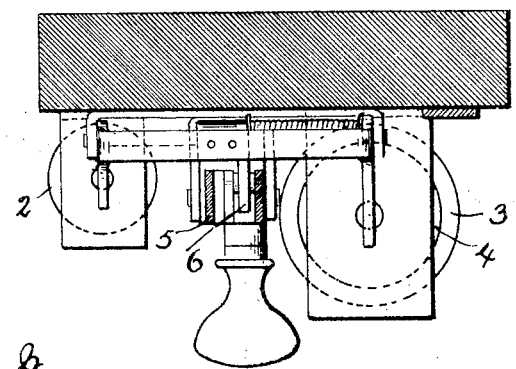

Figure 1 is a view in perspective. Fig. 2 is a front elevation of the same. Fig. 3 is a horizontal cross-section on the line *x x* of Fig. 2, and Fig. 4 is a diagrammatic view of the various circuits employed.

Similar numerals refer to similar parts throughout the several views.

Figure 4:
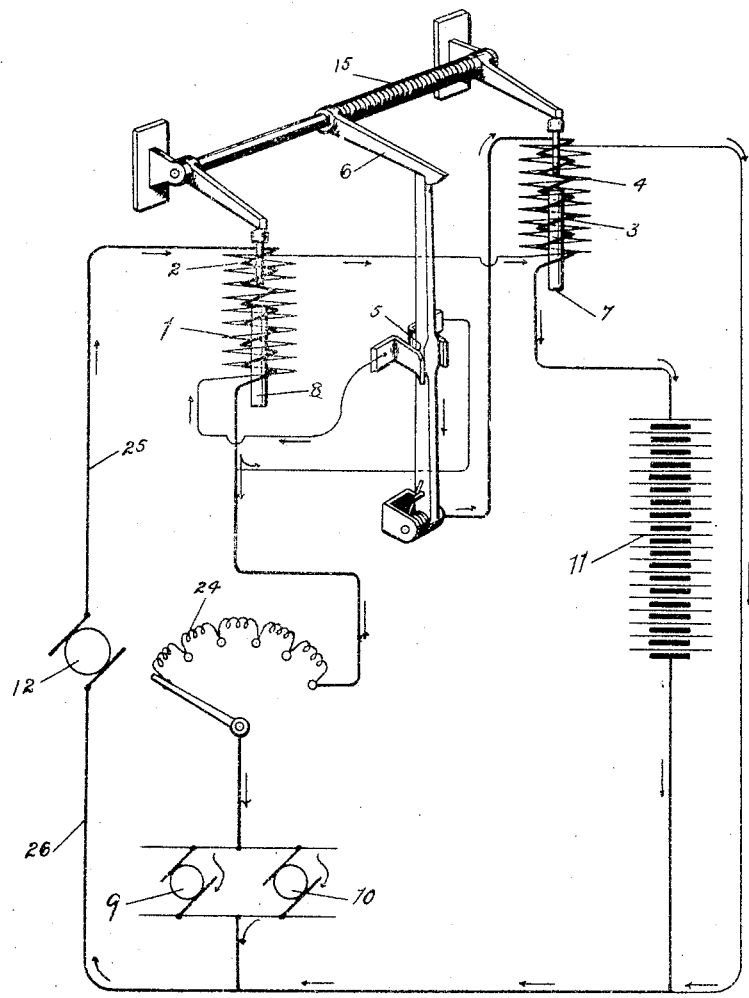

Referring to Fig. 1, 5 indicates the switch which interrupts the circuit of the storage battery 11, as shown in diagram Fig. 4. This switch is actuated by the spring 16, which normally tends to throw it to open-circuit position, and 6 indicates a latch for holding the same in circuit-closing position, said latch 6 being urged in a forward and downward direction by the spring 15. Switch-blade 5 carries a supplemental carbon contact 13, which coöperates with its associate, 14, to take the arc upon rupture of circuit in a manner well known. Switch-blade 5 and the support for the supplemental contact are supported on pivot 19, which is surrounded between the two portions of the switch by the spring 16. 1, 2, 3, and 4 are solenoid-coils. Coils 1 and 2 are associated together in relation with the same movable core 8, which is adjusted in its position with relation to said coils by a screw 18. Such adjustment determines the condition of the circuit at which the core 8 will be attracted and operate to release the switch. Coil 1 does not appear in Figs. 1 and 2, inasmuch as it is entirely surrounded by the winding 2, but is shown diagrammatically in Fig. 4. Coils 3 and 4 are also provided with and actuate the same movable core 7 upon predetermined electrical conditions hereinafter to be described, also to operate the latch to release the switch.

It is to be understood, of course, that in place of core and solenoid may be used coil, stationary core, and movable armature.

By the arrangement herein shown the time which elapses between the inception of the abnormal condition and the instant of opening the circuit is inversely proportional to the extent of the abnormal condition. In other words, the greater the condition of affairs sought to be guarded against the more quickly is the circuit opened.

The screw 17 affords a means of adjustment and determines at what extent of abnormal condition the core 7 is to perform its function of tripping the circuit-breaker.

20, 21, 22, and 23 show binding-posts or connectors for properly including the device in the circuit to be protected. Posts 20 and 21 are for the potential or high-resistance coils, whereas 22 and 23 are for the current-coils. By "potential" or "high-resistance" coil I mean a winding of comparatively great number of turns of conductor and relatively small cross-section which is adapted to be responsive to changes in potential of the circuit rather than current. In contradistinction to this term I use "current-coil" to designate a coarse-wire winding which is adapted to respond to fluctuations in current strength and to be more or less independent of potential variations.

Referring to the diagram given in Fig. 4, 12 indicates the source of energy supplying current through conductors 25 and 26, of which the former may be in the example of the trolley system or mining-locomotive the trolley-wire and the latter the rail or return-conductor. 9 and 10 are the motors or other translating devices subject to the control of a device 24, such as a rheostat or equivalent device, as a street-car controller, switch, &c., connected, on the one hand, to conductor 26 and receiving current from conductor 25 through coil 2, surrounding the core 8. Current is also supplied through said coil 2 through the switch 5 to the storage battery or other device capable of causing a reverse flow of energy in the circuit through the coil 3. Both of said coils 2 and 3 are of relatively large conductivity and are known as "current-coils." The remaining side of the battery or other device connects to the conductor 26. Coil 1 is shown with its lower terminal in contact with the switch 5, and therefore receiving current from conductor 25 through coil 2, its remaining terminal connecting, through coil 4, to conductor 26. With the switch closed, as shown in the diagram, and everything operating normally—as, for example, the mining-locomotive running with its trolley in contact with the trolley-wire and the motors and battery both receiving current from the generator 12—coils 1 and 2 have their magnetizing effects opposed to each other, and the same is true of coils 3 and 4.

Upon an abnormal current flowing in the circuit of the motors 9 and 10 coil 2 has ampere-turns sufficient to overcome the effect of coil 1 and open the circuit, as in the case of an ordinary overload circuit-breaker.

Under normal conditions the ampere-turns of coil 1 are almost sufficient to cause an opening of the circuit and may be in the neighborhood of ninety-five per cent. of the total ampere-turns necessary to operate the switch with the core in a certain position of adjustment by means of screw 18. This being the case, it is seen that it will take a relatively large current flowing through coil 2 to sufficiently overcome the effect of coil 1 to cause the opening of the circuit. On the other hand, if the potential of generator 12 should fall below that of the battery 11 said battery would force current back into the line and into the motors. The energy returned to the line from the battery 11 would flow through coil 2, and since this is in the reverse direction from normal coils 1 and 2 would operate cumulatively and open the circuit, the coil 2 being required to supply but a small number of ampere-turns, for the reason stated above—namely, that coil 1 is in itself almost sufficient to cause the operation of the circuit-breaker.

In case the energy supplied to the motors by the battery 11 should be excessive either in the case when said battery is discharging into line and motors or when the trolley is off and the battery is discharging through the motors only there is a flow of current through coil 3 in a sense opposite to normal, with a resulting cumulative action of the coils 3 and 4 sufficient to open the circuit.

With the trolley off and the motors 9 and 10 taking but their normal amount of energy the current through coil 3 is not sufficient to act in conjunction with coil 4 to cause the opening of the switch.

From the above description it is seen that my device operates to protect the battery in the example given or the device capable of returning energy to a circuit in the general case, both under conditions of wide fluctuations in potential, excessive supply of current, or excessive return of current, or excessive flow of energy in a local circuit when the main supply-generator is cut off.

Coils 1 and 4 have been shown connected in series. The object of this is to have a comparatively high resistance in the potential-coil circuits to keep down as much as possible the $C^2R$ or heat loss in said circuit. It is to be understood, however, that said coils may be connected in a parallel arrangement without departing from the spirit of my invention.

It is customary in charging secondary batteries to do so at a higher rate than said batteries are permitted to discharge, and it is seen from the previous description that my switch makes possible a rate of charge greater than the rate of discharge without interrupting the circuit.

It is to be further understood that my invention is not limited to electromagnetic means for operating upon a switch to accomplish the results above obtained, for it is possible to substitute for the magnets herein shown and described other electroresponsive devices which will operate in combination with each other as do the coils in the disclosure herein made.

It is to be understood also that my invention is not limited to a device for completely rupturing a circuit, but that any means may be used in place of the rupturing-switch which will change the electrical constants of a circuit—for example, in direct-current working the insertion or withdrawal of a resistance and in alternating current the insertion or withdrawal of an inductance capacity or resistance, or any combination of them.

What I claim is—

1. In an automatic circuit-controller, separable coöperative contacts, means for restraining said contacts in normal position, a differential electromagnet for operating said restraining means upon abnormal direct energy-flow or slight reversed energy-flow.

2. In an automatic circuit-controller, separable coöperative contacts, means for restraining said contacts in normal position, a plurality of independent releasing means each comprising a differential electromagnet composed of a current-coil and a potential-coil, the potential-coils being connected in series with each other.

3. In an automatic circuit-controller, separable coöperative contacts, means for restraining said contacts in normal position, a differential tripping-magnet having the circuits of its windings controlled by said contacts, and an independent tripping-magnet connected in series with said controller, and also in series with a translating device in a circuit parallel with a circuit controlled by said controller.

4. In an automatic circuit-controller, a plurality of separable contacts, a latch for restraining said contacts in normal position, a differential electromagnet operating upon excessive direct energy-flow to actuate said latch, and an independent differential electromagnet operative upon a relatively less reverse energy-flow for actuating said latch.

5. In an automatic circuit-controller, a plurality of separable coöperative contacts, a latch for restraining said contacts in normal position, a current-coil for actuating said latch, and an independent differential electromagnet for actuating said latch upon reversed energy-flow.

6. In an automatic circuit-controller, separable coöperative contacts, a latch for restraining said contacts in normal position, a differential electromagnet for actuating said latch upon excessive direct energy-flow, and another differential electromagnet for actuating said latch upon a relatively less reverse energy-flow, each differential electromagnet comprising a current-winding and a potential-winding.

7. In an automatic circuit-controller, separable coöperative contacts, means for restraining said contacts in normal position, a differential electromagnet for controlling said restraining means upon excessive flow of energy in normal direction, and another differential electromagnet for actuating said restraining means upon a relatively less flow of energy in a direction other than normal.

8. In an automatic circuit-controller, separable coöperative contacts, means for restraining said contacts in normal position, a differential electromagnet for controlling said restraining means upon excessive energy-flow in normal direction or upon relatively very slight energy-flow in a direction other than normal, and a further differential electromagnet for controlling said restraining means upon a relatively slight flow of energy in a direction other than normal.

9. In an automatic circuit-controller, separable coöperative contacts, means for restraining said contacts in normal position, a differential electromagnet for controlling said restraining means and having a potential-winding of ampere-turns nearly sufficient for the actuation of the controlling means, and a current-winding opposed to said potential-winding, whereby said restraining means is controlled upon excessive flow of energy in normal direction or upon very slight energy-flow in a direction other than normal.

10. In an automatic circuit-controller, separable coöperative contacts, means for restraining said contacts in normal position, a differential electromagnet for controlling said restraining means and having a potential-winding of ampere-turns nearly sufficient for the actuation of the controlling means, and a current-winding opposed to said potential-winding, and another differential electromagnet for controlling said restraining means upon the occurrence of relatively small reversed energy-flow.

11. In an automatic circuit-controller, separable coöperative contacts, means for restraining said contacts in normal position and automatic magnetic means comprising a plurality of differential electromagnets responsive to different magnitudes of electrical effects for controlling said restraining means.

12. In an automatic electric switch, separable coöperative contacts, means for restraining said contacts in normal position, an overload-coil for controlling said restraining means, a current-coil, a potential-coil, said current-coil and said potential-coil coöperating to control said restraining means upon the occurrence of low voltage or reversed energy-flow.

13. In an automatic electric switch, separable coöperative contacts, means for restraining said contacts in normal position, a current-coil for controlling said restraining means upon predetermined current-flow, a second current-coil, a potential-coil, said second current-coil and potential-coil coöperating to control said restraining means upon the occurrence of low voltage or reversed energy-flow.

14. In an automatic electric switch, separable coöperative contacts, means for restraining said contacts in normal position, means responsive to overload for controlling said restraining means and means responsive to low voltage or reversed energy-flow for controlling said restraining means.

15. In an automatic electric switch, separable coöperative contacts, means for restraining said contacts in normal position, and means responsive to reversed energy-flow or low voltage for controlling said restraining means.

16. In an automatic electric switch, separable coöperative contacts, means for restraining said contacts in normal position, and automatic magnetic means responsive to low voltage or reversed energy-flow for controlling said restraining means.

17. In an automatic electric switch, separable coöperative contacts, means for restraining said contacts in normal position, an overload-coil for controlling said restraining means, and means for controlling said restraining means upon low voltage or reversed energy-flow, comprising a current-winding and a potential-winding coöperating upon the same magnetic circuit.

18. In an automatic electric switch, separable coöperative contacts, means for restraining said contacts in normal position, means responsive to overload to control said restraining means, and independent means responsive to either low voltage or reversed energy-flow for controlling said restraining means.

19. In an automatic electric switch, separable coöperative contacts, a latch for restraining said contacts in normal position, means for actuating said latch upon overload, and means for actuating said latch upon low voltage or reversed energy-flow.

20. In an automatic electric switch, separable coöperative contacts, means for restraining said contacts in normal position, and a plurality of means for controlling said restraining means and responsive to abnormal current-flow, reversed energy-flow or low voltage.

21. In an automatic electric switch, separable coöperative contacts, a latch for restraining said contacts in normal position, and a plurality of means for actuating said latch and responsive to abnormal current-flow, reversed energy-flow or low voltage.

WILLIAM M. SCOTT.

Witnesses:
 JNO. STOKES ADAMS,
 MAE HOFFMANN.